United States Patent [19]

Endo et al.

[11] Patent Number: 5,017,684

[45] Date of Patent: May 21, 1991

[54] METHOD OF POLYMERIZING EPOXY COMPOUND

[75] Inventors: Takeshi Endo, Kanagawa; Yoko Nambu; Keiji Abe, both of Tokyo, all of Japan

[73] Assignee: Asahi Denka Kogyo K.K., Tokyo, Japan

[21] Appl. No.: 502,415

[22] Filed: Mar. 30, 1990

[30] Foreign Application Priority Data

Apr. 21, 1989 [JP] Japan .................................. 1-102375

[51] Int. Cl.$^5$ ......................... C08G 65/22; C07F 7/04
[52] U.S. Cl. .................................... 528/409; 528/408; 556/469; 556/470
[58] Field of Search ................ 528/408, 409; 556/469, 556/470

[56] References Cited

U.S. PATENT DOCUMENTS

| | | | |
|---|---|---|---|
| 3,503,898 | 3/1970 | Harris | 528/409 X |
| 3,660,315 | 5/1972 | Hill et al. | 528/409 X |
| 4,336,366 | 6/1982 | Berner et al. | 528/93 X |
| 4,448,980 | 5/1984 | Sogah | 556/470 X |

Primary Examiner—Earl Nielsen

Attorney, Agent, or Firm—Flynn, Thiel, Boutell & Tanis

[57] ABSTRACT

A polymer of an epoxy compound is selectively obtained by polymerizing an epoxy compound having the formula (I):

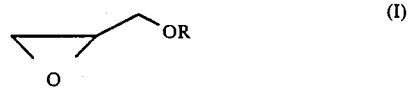

(I)

wherein R is a substituted or unsubstituted alkyl group, by using an initiator comprising a silyl ether represented by the general formul (II):

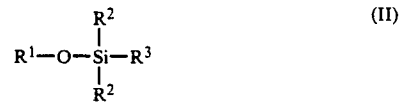

(II)

wherein $R^1$, $R^2$ and $R^3$ are each a substituted or unsubstituted alkyl or aryl group, in the presence of an inorganic fluoride catalyst, thereby preparing a polyether having a silyloxy group in its terminal.

1 Claim, 1 Drawing Sheet

METHOD OF POLYMERIZING EPOXY COMPOUND

The present invention relates to a method of polymerizing an epoxy compound.

PRIOR ART

A polyether prepared by the ring-opening polymerization of an epoxy compound is used in a wide range of applications such as special rubbers or surfactants.

An advance of the polymerization technique has made it possible to synthesize a polymer having a regulated structure such as regulated molecular weight, molecular weight distribution, chain distribution of a copolymer and the terminal group. This has led to the development of a novel functional polymer, and a similar attempt has been made on a polyether.

The polymerization of an epoxy compound in the presence of a cationic catalyst gives rise to only a low-molecular weight polymer and brings about many side reactions. The anionic polymerization of ethylene oxide in the presence of an alkali catalyst proceeds according to the living polymerization mechanism and gives rise to a monodisperse polyether, but is disadvantageous in that the kind of monomer used is limited. Although a high-molecular weight polyether can be prepared by anionic coordination polymerization, it is difficult in this method to regulate the molecular weight and distribution thereof.

Inoue et al. reported that an aluminum porphin complex acted as an initiator very useful for the living polymerization of an epoxy compound [see S. Inoue and T. Aida, Macromol. Chem. Macromol. Symp., 6, 217 (1986)].

Webster et al. prepared a monodisperse polymer of an ester of methacrylic acid by group transfer polymerization through the use of silyl ketene acetal see D. Y. Sogah, W. R. Hertler, O. W. Webster and G. M. Cohen, Macromolecules, 20, 1473 (1987)]. However, there is no example of the ring-opening polymerization in their report.

SUMMARY OF THE INVENTION

The present inventors have newly found that in the reaction of a silyl ether with an alkyl glycidyl ether in the presence of CsF as a catalyst, the addition product further reacts with excess alkyl glycidyl ether as opposed to the reaction with an aryl glycidyl ether, which has lead to the present invention relating to a novel method of polymerizing an epoxy compound which enables a high degree of regulation of the structure through application of the above reaction.

Specifically, the method of polymerizing an epoxy compound according to the present invention is characterized by polymerizing an epoxy compound represented by the general formula (I):

(I)

wherein R is a substituted or unsubstituted alkyl group, by using an initiator comprising a silyl ether represented by the general formula (II):

wherein $R^1$, $R^2$ and $R^3$ are each a substituted or unsubstituted alkyl or aryl group, in the presence of an inorganic fluoride catalyst, thereby preparing a polyether having a silyloxy group at its terminal.

Examples of the epoxy compound represented by the general formula (I) include a glycidyl ether wherein R is an alkyl group having 1 to 20 carbon atoms, a halogen-substituted alkyl group, or an alkyl group substituted by an olefin, nitrile, ester, amide or amine ether group, and preferred examples thereof include a glycidyl ether wherein R is a straight-chain or branched alkyl group having 1 to 4 carbon atoms.

Examples of the silyl ether represented by the general formula (II) include one wherein $R^1$, $R^2$ and $R^3$ are each an alkyl group having 1 to 20 carbon atoms, an aryl group, or an arylcarbonyloxy-, alkyl-, vinyl-, halogen-, cyano- or carbamoyl-substituted aryl group, and preferred examples thereof include an unsubstituted or alkyl-substituted phenyl trialkylsilyl ether.

The amount of the silyl ether compound used as the initiator in the present invention is about 0.001 to 0.5 equivalent, preferably about 0.01 to 0.2 equivalent based on the epoxy compound represented by the general formula (I).

The inorganic fluoride catalyst used in the present invention include a fluoride of alkali metals, e.g., CsF and KF.

The amount of use of the inorganic fluoride catalyst is preferably 0.001 to 0.05 equivalent, still preferably 0.005 to 0.02 equivalent based on the epoxy compound represented by the general formula (I).

The polymerization according to the present invention may be conducted in the absence of any solvent or in an aprotic solvent. Examples of the aprotic solvent include acetonitrile, acetone, DMF and THF. The amount of use of the aprotic organic solvent is preferably about 0.3 to 2 equivalents based on the epoxy compound represented by the general formula (I).

The polymerization according to the present invention may be conducted in a deaerated sealed tube at 100° to 200° C. for 1 min to 10 hr.

A preferred embodiment of the present invention will now be described.

An alkyl glycidyl ether is polymerized in the absence of any solvent by making use of 0.01 to 0.2 equivalent of a substituted phenyl trimethylsilyl ether as an initiator in the presence of 0.005 to 0.02 equivalent of CsF as a catalyst in a deaerated sealed tube at 115° to 150° C. for 5 min to 2 hr.

After the completion of the reaction, the catalyst is filtered off and an unreacted glycidyl ether is removed in vacuo to prepare a highly monodisperse polyether or oligoether represented by the following formula:

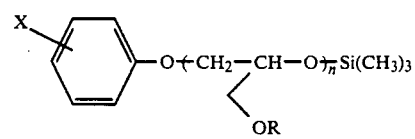

In the present invention, a glycidyl ether type epoxy compound is polymerized by a novel polymerization method.

According to the present invention polymerization proceeds in a short time without the use of any acid or base, and a highly monodisperse polyether can be obtained. The molecular weight can be easily regulated by varying the molar ratio of the epoxy compound to the initiator, which enables the preparation of also an oligomer. Further, this technique can be applied to the synthesis of block copolymers and star polymers. Further, the polymerization according to the present invention is highly selective and can be applied to the preparation of polyethers having various functional groups and the development of novel macromers.

The polymerization system of the present invention requires heating at a temperature of 100° C. or above and therefore can be utilized also as a thermal latent polymerization initiator for an epoxy compound.

Figure 1:
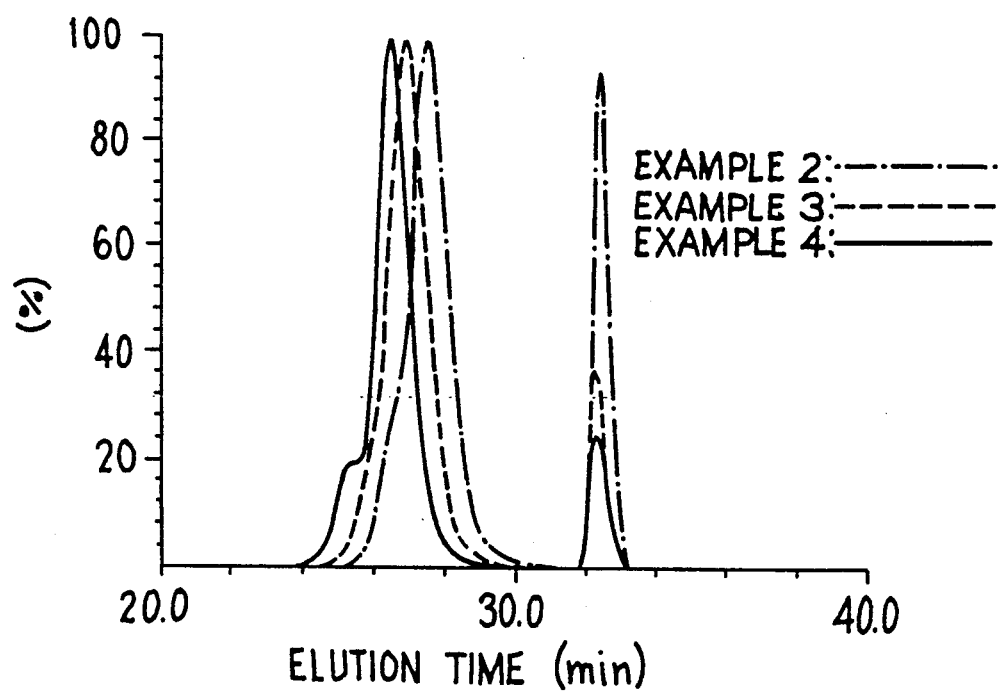
FIG. 1 shows the results of GPC analysis wherein the catalyst is filtered off from the reaction mixtures obtained in Examples 2 to 4 and the filtrates are dissolved in tetrahydrofuran for analysis.

In these charts, the right peaks refer to elution curves derived from the epoxy monomer while the left peaks refer to elution curves derived from the polyethers.

EXAMPLES

The present invention will now be described in more detail by way of the following Examples, though the present invention is not limited to these Examples only.

EXAMPLE 1

260 mg (1.71 mmol) of CsF was weighed in a polymerization tube and heat-dried. 12.2 ml (85.6 mmol) of n-butyl glycidyl ether and 0.31 ml (1.71 mmol) of phenyl trimethylsilyl ether were added thereto, and the polymerization tube was deaerated and sealed. Then, polymerization was conducted at 130° C. for 15 min. After the completion of the reaction, the reaction mixture was filtered to remove CsF and an unreacted glycidyl ether was removed in vacuo, thereby preparing 9.2 g (yield: 82%) of a polyether.

The results of IR and $^1$H—NMR analyses have revealed that the polyether has the following structure having a phenoxy group and a trimethylsilyloxy group at its terminals.

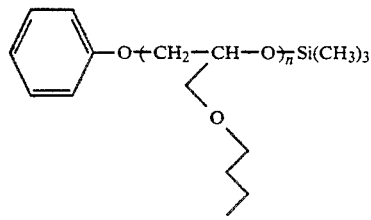

Further, the results of GPC analysis [solvent: tetrahydrofuran, molecular weight (in terms of polystyrene): $\overline{Mn}=5310$ (calculated value: 5490), molecular weight distribution $(D=\overline{Mw}/\overline{Mn})=1.17$] have proved that the polymerization method of the present invention gives a highly monodisperse polyether.

EXAMPLES 2 to 4

130 mg (0.85 mmol) of CsF was weighed in a polymerization tube and heat-dried. 12.2 ml (85.6 mmol) of n-butyl glycidyl ether and 0.31 ml (1.71 mmol) of phenyl trimethylsilyl ether were added thereto, and the reaction was conducted at 115° C. for 15 min, 40 min and 80 min in the same manner as that of Example 1, thereby preparing polyethers.

GPC charts of the products prepared in Examples 2 to 4 are given in FIG. 1. It is apparent that a highly monodisperse polymer can be prepared by the polymerization system of the present invention and the molecular weight increases with an increase in the degree of polymerization.

EXAMPLE 5

130 mg (0.856 mmol) of CsF was weighed in a polymerization tube and heat-dried. 12.2 ml (85.6 mmol) of n-butyl glycidyl ether and 1.56 ml (8.56 mmol) of phenyl trimethylsilyl ether were then added thereto, and the reaction was conducted at 130° C. for 30 min in the same manner as that of Example 1, thereby preparing 6.70 g (yield: 60%) of a polyether.

EXAMPLE 6

260 mg (1.7 mmol) of CsF was weighed in a polymerization tube and heat-dried. 7.7 ml (85.6 mmol) of methyl glycidyl ether and 0.31 ml (1.7 mmol) of phenyl trimethylsilyl ether were then added thereto, and the reaction was conducted at 130° C. for 30 min in the same manner as that of Example 1, thereby preparing 7.5 g (yield: 100%) of a polyether. $\overline{Mn}=2440$. $D=1.23$.

Comparative Example 1

A polyether was prepared by a reaction at 130° C. for 30 min in the same manner as that of Example 1, except that cesium phenolate (PhOCs) was used instead of the initiator and inorganic fluoride catalyst of the present invention.

The reaction conditions and the results of GPC on the products obtained in Examples 1 to 5 and Comparative Example 1 are given in Table 1 wherein the molecular weight is expressed in terms of polystyrene. As opposed to the polymerization in the presence of the phenoxide anion in Comparative Example 1, polyethers having a narrow molecular weight distribution (D) could be obtained by the polymerization in Examples 1 to 5. The number average molecular weight ($\overline{Mn}$) well agreed with the calculated value determined from the ratio of the monomer to the initiator (silyl ether) and the conversion, so that the molecular weight could be easily regulated. These results demonstrate that the polymerization system of the present invention is of a living polymerization type.

TABLE 1

| | Silyl ether (mol %) | CsF (mol %) | Polymerization conditions temp. (°C.) | Polymerization conditions time (min) | Yield (%) | $\overline{Mn}$ found | $\overline{Mn}$ calculated | D* |
|---|---|---|---|---|---|---|---|---|
| Ex. 1 | 2 | 2 | 130 | 15 | 82 | 5310 | 5500 | 1.17 |

TABLE 1-continued

| | Silyl ether (mol %) | CsF (mol %) | Polymerization conditions | | Yield (%) | $\overline{M_n}$ | | D* |
| --- | --- | --- | --- | --- | --- | --- | --- | --- |
| | | | temp. (°C.) | time (min) | | found | calculated | |
| Ex. 2 | 2 | 1 | 115 | 15 | 38 | 2610 | 2640 | 1.17 |
| Ex. 3 | 2 | 1 | 115 | 40 | 61 | 3650 | 4140 | 1.15 |
| Ex. 4 | 2 | 1 | 115 | 80 | 68 | 4700 | 4590 | 1.18 |
| Ex. 5 | 10 | 1 | 130 | 30 | 60 | 1035 | 950 | 1.13 |
| Comp. Ex. 1 | 2** | | 130 | 30 | 100 | 8380 | 6600 | 1.53 |

Note:
*$D = \overline{M_w}/\overline{M_n}$
**cesium phenolate

We claim:
1. A method of polymerizing an epoxy compound, characterized by polymerizing an epoxy compound represented by the general formula (I):

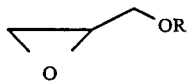 (I)

wherein R is a substituted or unsubstituted alkyl group, by using an initiator comprising a silyl ether represented by the general formula (II):

 (II)

wherein $R^1$, $R^2$ and $R^3$ are each a substituted or unsubstituted alkyl or aryl group, in the presence of an inorganic fluoride catalyst, thereby preparing a polyether having a silyloxy group in its terminal.

* * * * *